US010041627B2

(12) United States Patent
Thjunjoto et al.

(10) Patent No.: US 10,041,627 B2
(45) Date of Patent: Aug. 7, 2018

(54) AUTOMATIC LUBRICATION DEVICE

(71) Applicants: Thjunjoto, Berlin (DE); Peter Hoppe, Berlin (DE); Antonio Manhica, Berlin (DE); Holger Schmidt, Klein-Machnow (DE)

(72) Inventors: Thjunjoto, Berlin (DE); Peter Hoppe, Berlin (DE); Antonio Manhica, Berlin (DE); Holger Schmidt, Klein-Machnow (DE)

(73) Assignee: SKF LUBRICATION SYSTEMS GERMANY GmbH, Walldorf (DE)

( * ) Notice: Subject to any disclaimer, the term of this patent is extended or adjusted under 35 U.S.C. 154(b) by 273 days.

(21) Appl. No.: 15/196,457

(22) Filed: Jun. 29, 2016

(65) Prior Publication Data
US 2016/0377226 A1 Dec. 29, 2016

(30) Foreign Application Priority Data
Jun. 29, 2015 (DE) .................. 10 2015 212 030

(51) Int. Cl.
F16N 29/04 (2006.01)
F16N 7/38 (2006.01)
(Continued)

(52) U.S. Cl.
CPC .............. F16N 29/04 (2013.01); F16N 7/38 (2013.01); F16N 25/02 (2013.01);
(Continued)

(58) Field of Classification Search
CPC . F16N 29/04; F16N 7/38; F16N 25/02; F16N 2250/08; F16N 2260/20; H04B 7/24
See application file for complete search history.

(56) References Cited

U.S. PATENT DOCUMENTS 4,768,471 A * 9/1988 Draxler ................ F01M 1/20
123/196 S
5,987,975 A * 11/1999 Rafei .................. F01M 1/22
123/196 S
(Continued)

FOREIGN PATENT DOCUMENTS

DE 102006029236 A1 11/2007
DE 102011053022 A1 2/2013
DE 112011103953 T5 12/2013

Primary Examiner — Michael A Riegelman
(74) Attorney, Agent, or Firm — Bryan Peckjian; SKF USA Inc. Patent Dept.

(57) ABSTRACT

An automatic lubrication device includes a lubricant container configured to receive a lubricant, a lubricant delivery device for delivering the lubricant, a pump configured to pump the lubricant from the lubricant container to the lubricant delivery device, a drive configured to drive the pumping device, the drive being coupled to the pump via a force-transmission device, an internal control device for controlling the drive, and a control panel configured to enter control commands for the internal control device as an interface for an operator. Components of the automatic lubrication device that include potential electrical or non-electrical ignition sources each include at least one suitable type of protection, which makes the potential ignition sources ineffective, so that a potential fire- or explosion-risk emanating from the automatic lubrication device is eliminated when the automatic lubrication device is used in a fire- and/or explosion-endangered environment.

18 Claims, 4 Drawing Sheets

(51) Int. Cl.
*H04B 7/24* (2006.01)
*F16N 25/02* (2006.01)

(52) U.S. Cl.
CPC ...... *F16N 2250/08* (2013.01); *F16N 2260/20* (2013.01); *H04B 7/24* (2013.01)

(56) References Cited

U.S. PATENT DOCUMENTS

| | | | | |
|---|---|---|---|---|
| 2002/0151229 A1* | 10/2002 | Kanno | ..................... | F01M 1/24 440/1 |
| 2007/0062481 A1* | 3/2007 | Schaller | ................... | F01M 1/16 123/196 S |
| 2008/0264726 A1* | 10/2008 | Cornet | ................... | F01D 25/20 184/6.11 |
| 2009/0078507 A1* | 3/2009 | Gaugush | ................... | F16N 7/38 184/6.4 |
| 2013/0068562 A1* | 3/2013 | Cornet | ................... | F01M 11/12 184/6.4 |

\* cited by examiner

AUTOMATIC LUBRICATION DEVICE

CROSS-REFERENCE

This application claims priority to German patent application no. 10 2015 212 030.9 filed on Jun. 29, 2015, the contents of which are fully incorporated herein by reference.

TECHNOLOGICAL FIELD

The disclosure relates to a device for the automatic providing of lubricant, in particular a lubricant pump that is configured for use in a fire- and/or explosion-endangered environment.

BACKGROUND

For equipment, machines, and systems that are intended for use in fire- and/or explosion-endangered environments, for safety reasons special requirements apply with respect to fire- and/or explosion-protection. Known devices for automatic providing of lubricant, e.g., of a rolling-element bearing, that are provided for the providing of lubricant in such hazardous environments and include components including potential ignition sources, such as, e.g., electric motors and/or electric control devices, are therefore often disposed outside the hazardous environments or are configured as approved standard components specifically for fire- and/or explosion-endangered environments, e.g., including an appropriate protective encapsulation. Such solutions are often very technically and economically intensive. For this reason in many fire- and/or explosion-endangered environments the lubrication of rolling-element bearings occurs manually.

SUMMARY

It is therefore an aspect of the present disclosure to provide a device for the automatic providing of lubricant, in particular a lubricant pump that is configured for use in a fire- and/or explosion-endangered environment and manufacturable in a cost-effective manner.

Embodiments relate to a device for automatic providing of lubricant, which device comprises a lubricant container for receiving a lubricant, a lubricant delivery device for delivery of the lubricant, a pumping device for pumping the lubricant from the lubricant container to the lubricant delivery device, and a drive device for driving the pumping device. Here the drive device is coupled to the pumping device via a force-transmission device. The device further comprises an internal control device for controlling the drive device and an operating device for entry of control commands for the internal control device as an interface for an operator. Components of the device that include potential electrical or non-electrical ignition sources each include at least one appropriate type of protection, which makes the potential ignition sources ineffective so that a potential fire- or explosion-danger emanating from the device in a fire- and/or explosion-endangered environment is eliminated.

The lubricant container is preferably a substantially closed tank that includes at least one preferably closable lubricant fill opening and one lubricant delivery opening. The lubricant container preferably includes a pressure-equalizing device, e.g., a pressure-equalizing valve, that is configured for reducing a negative pressure in the lubricant container caused by the delivery of lubricant. At least partial regions of the lubricant container that come into contact with lubricant include a material that is lubricant-resistant and essentially does not chemically react with the lubricant. The lubricant container is a component of the device that possibly requires no special encapsulation for use in a fire- and/or explosion-endangered environment, since no ignition sources, such as, for example, excessive heating, sparks, electrostatic charges or flames can potentially arise with use of the lubricant container. In the embodiment conductive or dissipative materials are used, and the grounding of all components is ensured in order to inhibit the risk of ignition emanating from an electrostatic charge. Non-conductive materials are optionally usable.

The lubricant delivery device is a delivery interface of the device via which lubricant is deliverable to a to-be-lubricated object or to a to-be-lubricated region, such as, e.g., a lubrication nipple of a rolling-element bearing or a lubricant line. The lubricant delivery device preferably includes a terminal for a lubricant line. Alternatively the lubricant delivery device includes a lubricant line that is connectable to a lubricant receptor of a to-be-lubricated object. The lubricant delivery device is a component of the device that possibly requires no special encapsulation for use in a fire- and/or explosion-endangered environment, since no ignition sources, such as, for example, excessive heating, sparks, electrostatic charges or flames can potentially arise with use of the lubricant delivery device. In the embodiment conductive or dissipative materials are used, and the grounding of all components is ensured in order to inhibit the risk of ignition emanating from an electrostatic charge. Non-conductive materials are optionally usable.

The pumping device is configured to pump the lubricant from the lubricant container to the lubricant delivery device. The pumping device is preferably configured as a lubricant pump or includes at least one lubricant pump. It is preferred that the pumping device includes no integrated drive. Thus the pumping device is drivable via a drive device, e.g., via a shaft or a fluid line. The pumping device is a component of the device that possibly requires no special encapsulation for use in a fire- and/or explosion-endangered environment, since no ignition sources, such as, for example, excessive heating, sparks, electrostatic charges or flames can potentially arise with use of the pumping device. In the embodiment conductive or dissipative materials are used and the grounding of all components is ensured in order to inhibit the risk of ignition emanating from an electrostatic charge. Non-conductive materials are optionally usable.

The drive device is configured for driving the pumping device. A torque, a force, or a pressure generated by the driving device is transmissible via a force-transmission device from the drive device to the pumping device. In this manner the pumping device is drivable and lubricant is pumpable from the lubricant container to the lubricant delivery device. The drive device is a component of the device that possibly requires a special encapsulation for use in a fire- and/or explosion-endangered environment, since risk factors that are suitable for triggering a fire or an explosion, such as, for example, excessive heating, sparks, or flames can potentially arise with use of the drive device. Therefore the drive device can also include an encapsulation. Due to the encapsulation the drive device can include an effective shielding from a fire- or explosion-endangered environment.

Compared to known devices disclosed embodiments may have the advantage that the complete device is usable in a fire- or explosion-endangered environment. Due to a need-oriented encapsulation of individual components of the device that considers a potential risk to the environment due to the respective components, manufacturing costs of the device are significantly reducible compared to fully encapsulated devices. Here the disclosure is based on the idea that for each component an individual type of ignition protection is provided that considers a risk for the environment emanating from the respective component. Thus some components, such as, e.g., the drive device, include a corresponding encapsulation. Components from which essentially no risk for the environment emanates, such as, e.g., the lubricant container, possibly require no encapsulation and accordingly also include no encapsulation. Using the device a lubricating function is automatable in fire- and explosion-endangered environments.

The device can be used and is particularly suitable for use in the widest variety of lubrication systems, such as, e.g., single-line, multi-line, and progressive-central lubrication systems. Examples of such applications are depicted in FIGS. 2, 3, and 4.

The operating device can additionally make possible a need-adapted adjusting of the device. Thus, for example, a lubricant delivery rate, pause times, etc. can be adjusted via the operating device. For this purpose the operating device can preferably include one or more operating panels (control panels). Furthermore, the operating device can be configured to output an operating state of the device. For this purpose the operating device can include one or more displays. For example, the operating device can output a lubricant level of the lubricant container, a lubricant volume flow, temperatures of individual regions of the device, and/or warnings. This possibly has the advantage that the device is controllable or monitorable by an operator directly at the device.

According to some exemplary embodiments the device includes a first sensor that is configured for recording at least one first temperature, and/or the device includes a first temperature protection switch that is configured for interrupting a power supply of the operating device upon recording of a defined first maximum temperature. Such a first sensor has the advantage that a potential ignition risk due to heat is detectable for the environment of the operating device. A temperature protection switch also has the further advantage that a further generation of heat that represents an ignition risk for the environment is preventable by automatic switching off of the operating device. The operating safety of the device is thereby further improved.

In some exemplary embodiments the operating devices satisfies the standards IEC 60079-11 and IEC 60079-0 of the International Electrotechnical Commission (IEC). IEC 60079-0 specifies the general requirements for the construction, testing, and marking of electrical equipment that is intended for use in explosion-endangered regions. The standard IEC 60079-11 of the IEC ensures a so-called intrinsically safe operation of the operating device. In an intrinsically safe operating mode the power used for operating the equipment and for communication is limited such that energy added to the environment by a malfunction, for example, by a spark in the case of a short circuit, can cause no explosion of the gas mixture of the environment. Intrinsically safe power is as a rule designed sufficiently below the minimum ignition energy of explosive gases or dusts present in the environment. In the case of a fault the input power to the faulty components is converted into heat and increases the temperature of the equipment. Here the temperature at every point on the equipment must still lie sufficiently below the ignition temperature of the gases or dusts present in the environment. The power loss must therefore be limited. The intrinsically safe operation can offer a good protection of an environment of the operating device from risk factors that can potentially arise during operation of the operating device.

According to some embodiments the drive device comprises an electric motor and/or a fluid pump. For example, torques or fluid flows are generatable using such drive devices. These torques or fluid flows are conductible to the pumping device via the force transmission device. This has the advantage that a pump flow of the lubricant is particularly well controllable.

According to some exemplary embodiments the drive device and the internal control device include a first encapsulation that satisfies the standards IEC 60079-1 and IEC 60079-0 of the IEC. Here the first encapsulation can be embodied as a common encapsulation for the internal control device and the drive device, or comprise a plurality of partial encapsulations, which encapsulate the drive device and the internal control device. An encapsulation according to standards IEC 60079-1 and IEC 60079-0 is characterized in that the strength of the components is designed such that the explosion pressure of the explosion occurring inside the encapsulation can be sustained without damage or permanent deformation to the components. The openings on the encapsulation can include so-called explosion gaps that are embodied such that the energy released by the explosion on the way outward along the gap is so weakened and the temperature of the escaping gas is so reduced that the explosive gases present in the environment cannot be ignited Important tests that such encapsulations must pass are the pressure testing for mechanical strength of the components and the testing for flameproofness.

The first encapsulation can offer a very good protection of an environment of the drive device and the internal control device against ignition sources that can potentially arise during operation of the drive device and/or of the control device. It protects the explosive gases in the environment against the ignition risk from the encapsulated components that can possibly emanate both from the drive motor, electromagnetic shields, and/or other electromagnetic components, and from grinding and/or striking mechanical components.

According to some exemplary embodiments the internal control device for monitoring the lubricating function is equipped with an interface for internal sensor signals that are sensed inside the first encapsulation, and external sensor signals that are sensed outside the first encapsulation. The state of the lubricating function can thus possibly be monitored according to need by a variety of both internal and external sensor signals.

In some exemplary embodiments the device includes a second sensor that is configured for recording at least one second temperature, and/or the device includes a second temperature protection switch that is configured for interrupting a power supply of the drive device upon recording of a defined second maximum temperature. Such a second sensor has the advantage that a potential risk by heat for the environment of the drive device is detectable. A temperature protection switch also has the further advantage that a further generation of heat that represents an ignition risk for the environment despite the first encapsulation is preventable by automatic switching off of the drive device. The operating safety of the device is thereby further improved.

According to some exemplary embodiments the device includes a corded signal interface that is configured for coupling the device to an external superordinate control device. The signal interface is operated here in a mode of intrinsic safety, in particular according to the standards IEC 60079-11, IEC 60079-25, and/or IEC 60079-27, in addition to IEC 60079-0 of the IEC. Such a device has the advantage that a controlling of the device from a remote location, e.g., an environment wherein no particular fire- and/or explosion-risk exists, is possible.

In some exemplary embodiments the device includes a radio module that is configured for connecting the device to an external control device. A radio module has the advantage of an increased flexibility of use of the device. The radio module includes a second encapsulation that satisfies one of the norms IEC 60079-1, IEC 60079-5, or IEC 60079-18 in addition to IEC 60079-0 of the IEC. The standard IEC 60079-1 of the IEC ensures a pressure-resistant encapsulation of the radio module, the standard IEC 60079-5 ensures powder-filling of the radio module, and the standard IEC 60079-18 of the IEC ensures a cast encapsulation of the radio module. Here the second encapsulation offers a shielding of the radio module with respect to the environment, which shielding is adapted according to a risk for the environment emanating from the radio module. Such an encapsulation offers a good protection of an environment of the radio module from ignition sources that can potentially arise during operation of the radio module.

In some exemplary embodiments the device also includes at least one further signal interface that is configured for coupling of the device to one or more sensors for state monitoring of a device to which lubricant is delivered via the lubricant delivery device. Here the second signal interface satisfies the standard IEC 60079-11 and/or IEC 60079-25 in addition to IEC 60079-0 of the IEC. The coupling of the device to sensors for state monitoring can possibly make possible a need-based lubricant delivery to the monitored device, since, for example, the control unit can adjust a lubricant-delivery rate on the basis of measured values of the sensors in order to, for example, avoid a dry-running of a bearing of the monitored device. The standards IEC 60079-11 and IEC 60079-25 of the IEC ensure an intrinsically safe operation of the interface. The intrinsically safe operation can offer a good protection of an environment of the interface from ignition sources that can potentially arise during operation of the operating device.

According to some exemplary embodiments, in the case of a fault affecting a functionality of the pump the device provides a fault signal outward by a fault-signal line. The providing of the fault signal can possibly allow a display of the fault to a location remote from the device, e.g., an environment where there is no particular fire- and/or explosion-risk. Furthermore this fault signal can be evaluated by a control system in order to initiate safety-relevant measures, for example, in order to switch off the to-be-lubricated machine, since further operation of the machine following a lubrication failure can have safety-relevant consequences, e.g., excessive increase of temperature, which represents a potential ignition source emanating from the to-be-lubricated machine.

In some exemplary embodiments the pumping device includes at least one pressure-limiting device for limiting a lubricant pressure and/or a pressure-relief device for reducing the pressure in a section of the device and/or the lubricant container includes at least one fill-level sensor for recording at least one fill level of the lubricant container. A pressure-limiting device can have the advantage that the device is protected from a too-high pressure and thus from damage. A pressure-limiting device includes, for example, an overpressure valve. A pressure-release device can be of advantage in particular with piston distributors in single-line lubrication systems in order to be able to newly apply the piston distributors with pressure in each lubrication cycle. Here the lubricant in the metering chamber of the piston distributor is pushed out into the lubrication point. With a pressure relief of the lubrication line the metering chamber is filled again with lubricant. This is how a single-line lubrication system functions. A fill-level sensor possibly has the advantage that a fill level of the lubricant container is easily ascertainable. Thus, for example, a corresponding alarm signal is issuable, or in the device itself a switching off of the drive device is to be initiated.

According to some exemplary embodiments the lubricant container includes a stirring device for stirring the lubricant. From this the advantage possibly arises that a flowability of the lubricant is improved. This can be of advantage in particular in environments having relatively low temperatures.

BRIEF DESCRIPTION OF THE DRAWINGS

In the following the embodiments of the disclosure are explained in more detail with reference to the drawings.

DETAILED DESCRIPTION

Figure 1:
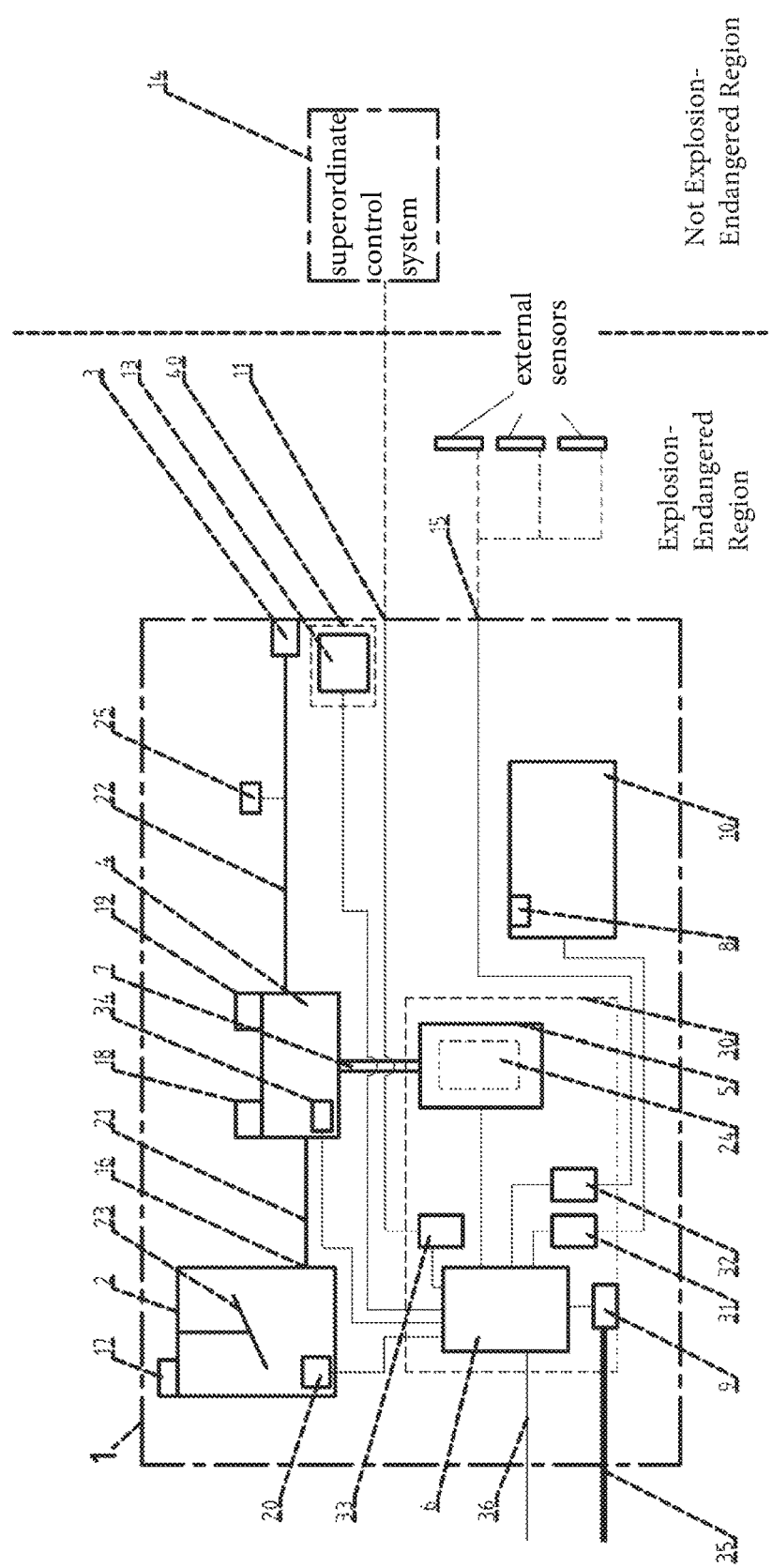
FIG. 1 schematically shows an embodiment of the device.

The embodiment depicted in FIG. 1 of a device 1 for automatic providing of lubricant includes a lubricant container 2 for receiving a lubricant. The lubricant container 2 can include a lubricant inlet 17 for filling of lubricant and a lubricant outlet 16 for delivery of lubricant. The lubricant inlet 17 is preferably closable by a cap and/or includes a valve. A stirring device 23 for stirring the lubricant for improving the flowability of the lubricant can optionally be disposed in the lubricant container 2. In FIG. 1 the lubricant container 2 is configured as an essentially closed lubricant container 2. Alternatively the lubricant container 2 can, for example, be open upward and optionally include a cover for closing. A fill-level sensor 20 for determining a fill level of the lubricant container 2 can be disposed inside the lubricant container 2. The fill-level sensor 20 is preferably configured to detect at least a minimum fill level. Alternatively the fill-level sensor 20 is configured, for example, to quantitatively record a fill level. The embodiment of the lubricant container complies with the requirements of the standards DIN EN 13463-1 and DIN EN 13463-5 so that no ignition risks can emanate from it.

The lubricant container 2 can be connected to a pumping device 4 via a first lubricant line 21, which pumping device 4 can be configured, for example, as a lubricant pump. The pumping device 4 can optionally include a pressure-limiting device 18 for releasing an overpressure and a pressure-release device 19 for depressurizing the lubricant line. The pumping device 4 is a passive component without an integrated motor and therefore is drivable and thus controllable via a drive device 5 that includes, for example, an electric motor 24. A rotating generated by the drive device 5 is transmissible to the pumping device 4 via a power transmission device 7. The pumping device 4 can include a pressure-sensor- or a pressure-switch-34 in order to determine a pressure in the pumping device and optionally to control an operation depending on the determined pressure. The embodiment of the pumping device complies with the requirements of the standards DIN EN 13463-1 and DIN EN 13463-5 so that no ignition risks can emanate from it. The pumping device 4 can connect via a second lubricant line 22 to a lubricant delivery device 3 that in this example is configured as a terminal nipple for a not-depicted lubricant line.

The device 1 includes an internal control device 6 that is configured for controlling the device 1, which internal control device may comprise control circuitry or a microprocessor, or any conventional circuitry for controlling a lubrication system. The internal control device 6 is coupled to an operating device 10 for entry of control commands for the internal control device 6. The operating device 10 can furthermore be coupled to a first temperature sensor 8 that is configured for measuring a temperature of an environment of the operating device 10. Furthermore, the internal control device 6 is coupled to a second temperature sensor 9 that is configured for measuring a temperature of an environment of the drive device 5. Measurement data recorded by the first temperature sensor 8, the second temperature sensor 9, and the fill-level sensor 20 are receivable and evaluable in this embodiment by the internal control device 6. Preferably the internal control device 6 is established so as to stop or slow the drive device 5 if the second temperature sensor 9 detects a temperature threshold value at the drive device 5. More preferably the internal control device 6 is established to stop the drive device 5 if the fill-level sensor 20 detects the falling-below of a minimum fill level of the lubricant container 2. Moreover the internal control device 6 is preferably established to switch off the device 1 if the first temperature sensor 8 detects a temperature threshold value at the operating device 10.

The operating device 10 can include one or more operating panels in order to program the internal controller 6 and thus to make possible a need-adapted adjustment of the device 1. Furthermore, the operating device can include one or more displays in order to output an operating state of the device 1. For example, the operating device can output a lubricant level of the lubricant container, a lubricant volume flow, temperatures of individual regions of the device 1, and/or warnings. The device 1 can thereby be directly controlled and monitored by a user at the device 1. The operating device 10 here satisfies the standards IEC 60079-11 and IEC 60079-0 of the IEC in order to ensure an intrinsically safe operation of the operating device 10.

The drive device 5 and the internal control device 6 include a first encapsulation 30 that protects an external environment from potential ignition sources, electrical and non-electrical, of the drive device 5 and the internal control device 6. The first encapsulation 30 here satisfies the standards IEC 60079-1 and IEC 60079-0 of the IEC. As shown in FIG. 1 the first encapsulation 30 can be embodied as a common encapsulation for the internal control device 6 and the drive device 5, or comprise a plurality of partial encapsulations, which encapsulate the drive device 5 and the internal control device 6. The standards IEC 60079-1 and IEC 60079-0 of the IEC ensure a pressure-resistant and flameproof encapsulation of the drive device 5 and the internal control device 6 so that the environment is protected from ignition risks from electrical and non-electrical ignition sources inside the encapsulation 30.

The device 1 can include a first isolation- and amplification-device 31 that is housed in the first encapsulation 30 in order to provide the operating display 10 with electrical energy and make possible a communication with the control device 6. The first isolation- and amplification-device 31 can provide the required power of the operating display and electrically isolate the operating panel from other electric circuits inside the first encapsulation. Furthermore the first isolation- and amplification-device 31 can limit a power of communication signals from the internal control device 6 to the operating display 10 and amplify communication signals from the operating display 10 to the internal control device 6.

The first isolation- and amplification-device 31 here satisfies the standard IEC 60079-11 and/or 60079-25 in addition to 60079-0 of the IEC.

Furthermore the device 1 can include a corded signal interface 11 that as shown in FIG. 1 can be coupled to the internal control device 6. In other exemplary embodiments the first signal interface 11 can also be coupled to other or further components of the device 1. For example, the first signal interface 11 can be directly coupled to the drive device 5. Via the corded signal interface 11 the device 1 can be coupled to an external control device 14 that can be disposed, for example, outside a risk zone. The device 1 is thereby operable and monitorable via the external control device 14. In some exemplary embodiments, for example, the drive device 5 can be monitored and controlled via the external control device 14.

Furthermore the device 1 can include a radio module 13. The device 1 can in turn or alternatively be connected to the external control device via the radio module 13. The radio module 13 includes a second encapsulation 40 that satisfies one of the norms IEC 60079-1, IEC 60079-5, or IEC 60079-18 in addition to IEC 60079-0 of the IEC. The standard IEC 60079-1 of the IEC ensures a pressure-resistant encapsulation of the radio module 13, the standard IEC 60079-5 ensures powder-filling of the radio module 13, and the standard IEC 60079-18 of the IEC ensures a cast encapsulation of the radio module 13. Here the second encapsulation 40 offers a shielding of the radio module 13 with respect to the environment, which shielding is adapted according to a risk for the environment emanating from the radio module 13. Such an encapsulation offers a good protection of an environment of the radio module 13 from ignition sources that can potentially arise during operation of the radio module 13.

A third isolation- and amplification-device 33 can be provided that is housed in the first encapsulation 30 in order to make possible the connecting of the external control device 14 to the internal control device 6. The third isolation- and amplification-device 33 can limit a power of communication signals to the external control device 14 and amplify communication signals from the external control device 14. Furthermore, the third isolation- and amplification-device 33 can electrically separate a communication bus of the external control device 14, at which an intrinsically safe operation prevails, from other electrical circuits inside the first encapsulation. The third isolation- and amplification-device 33 here satisfies the standard IEC 60079-11 and/or 60079-25 in addition to 60079-0 of the IEC.

The device 1 can include a further signal interface 15, which as shown in FIG. 1 can be coupled to the internal control device 6. The further signal interface 15 can be used for coupling the device 1 to one or more sensors for state monitoring of a device to which lubricant is delivered via the lubricant delivery device 3. The measurement data thus obtained can be used, for example, from the internal control device 6 for a need-based operating adaptation of the device 1. In some exemplary embodiments the internal control device 6 can, for example, control the operation of the drive device 5 on the basis of the measurement data obtained, in order to, for example, regulate a lubricant delivery to the device monitored by the sensors. In some embodiments the measurement data obtained can alternatively or additionally be transmitted via the corded signal interface 11 and/or the radio module 13 to the external control device 14. The circuits through the second signal interface 15 satisfy the standards IEC 60079-11 and IEC 60079-25 in addition to IEC 60079-0 of the IEC in order to ensure an intrinsically safe operation of the signal interface 15.

The device 1 can include a second isolation- and amplification-device 32 that is housed in the first encapsulation 30 in order to make possible the connecting of the one or more sensors for state monitoring to the control device 6. The second isolation- and amplification-device 32 here can limit the power of the sensor signals and electrically isolate the sensors from other electric circuits inside the first encapsulation 30. The second isolation- and amplification-device 32 can amplify the sensor signals and provide them to the internal control device 6. The second isolation- and amplification-device 32 satisfies the standard IEC 60079-11 and/or 60079-25 in addition to IEC 60079-09 of the IEC.

A fault-signal line 36 can be provided in order to output a fault signal outward in case of a fault, e.g., in a situation affecting the functionality of the drive device 5 or of the pump. Thus a display of the fault is made possible to a location remote from the device, e.g., an environment where there is no particular fire- and/or explosion-risk. This signal can also be evaluated by a superordinate control system, compare FIG. 5, in order to initiate safety measures due to a lubrication failure. Here the superordinate control system can decide whether one or more additional lubrication cycles should be initiated, or whether a redundant lubrication pump should be switched on, or whether the to-be-lubricated machine or device should be partially or completely switched off, or if a warning signal should be triggered, because an operation in dry-running can cause a significant heating in the bearing assembly due to a lubricant failure, which can lead to a potential ignition source for the environment with explosive gases or dusts, and thus a risk of explosion.

Figure 3:
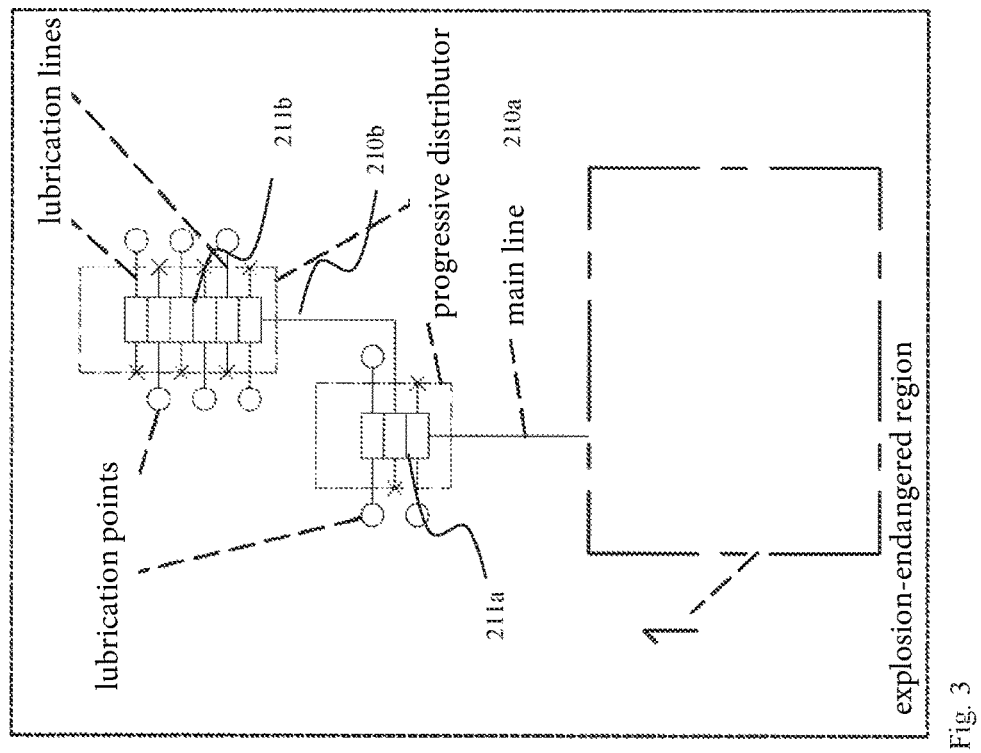
FIG. 3 schematically shows the device according to FIG. 1 used in a progressive-central lubrication system.
Figure 2:
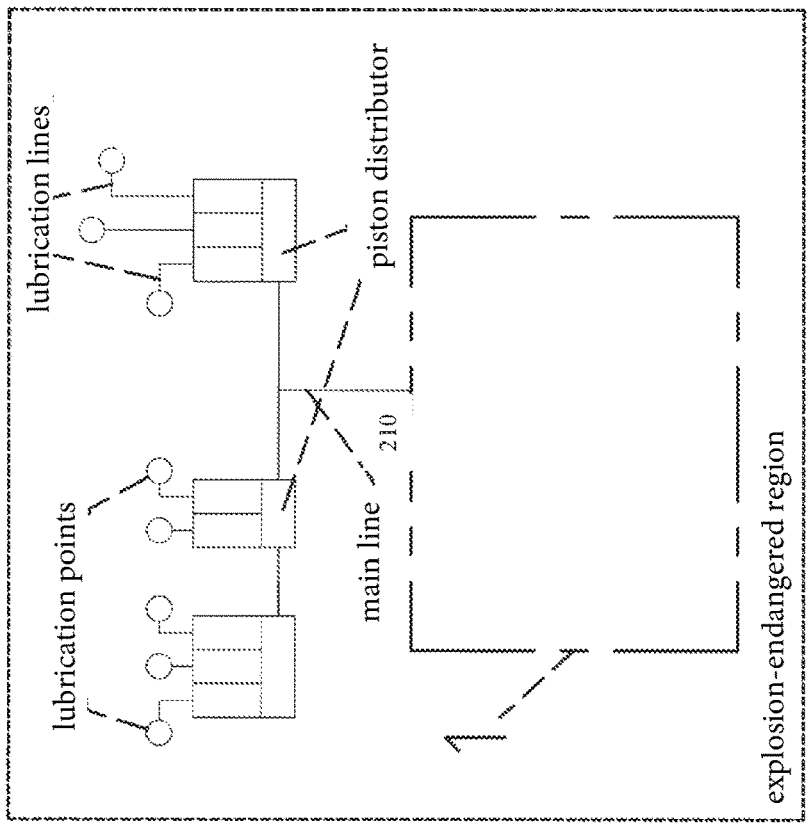
FIG. 2 schematically shows the device according to FIG. 1 used in a single-line lubrication system.
Figure 4:
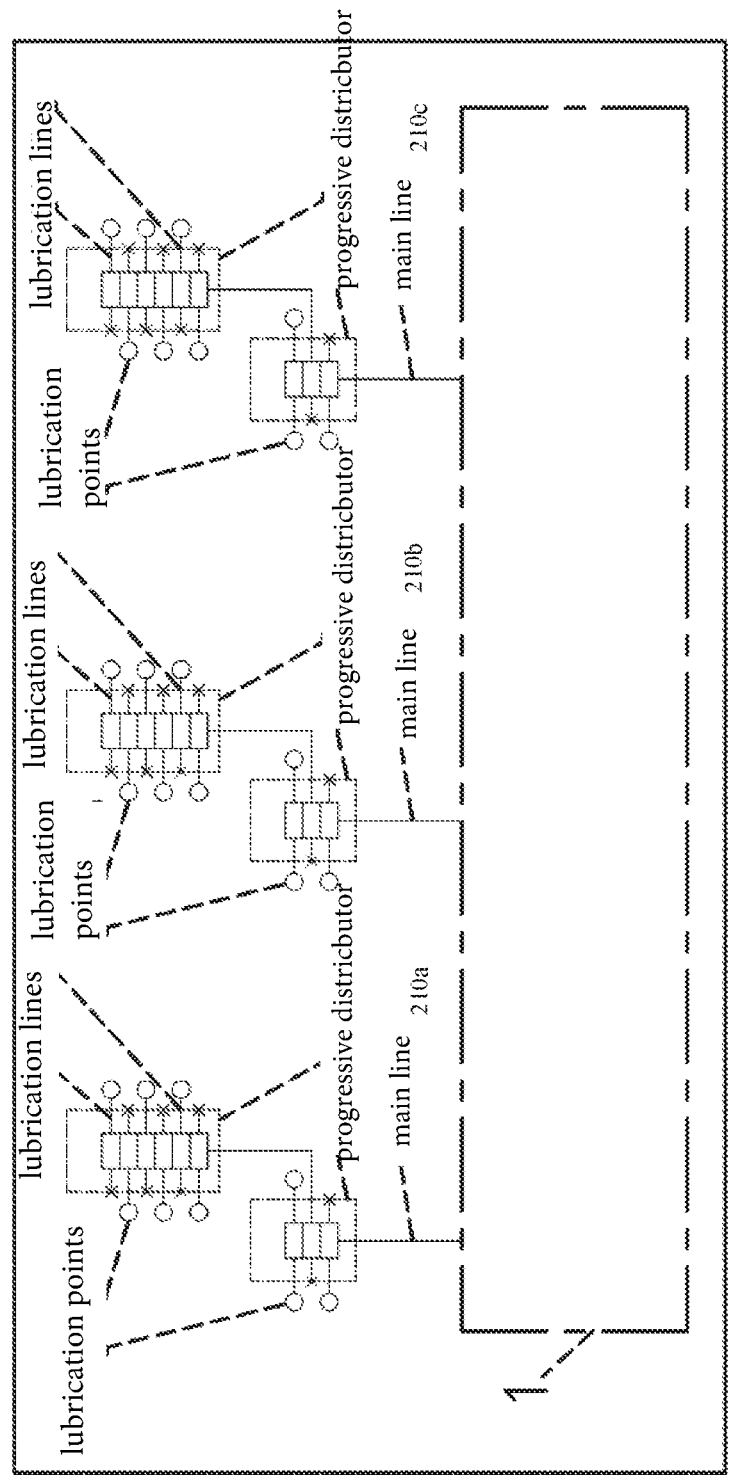
FIG. 4 schematically shows the device according to FIG. 1 used in a multiple-line system or in a multiple-circuit lubrication system.

FIGS. 2 to 4 show different applications of a device 1 for the automatic providing of lubricant. In particular, FIG. 2 shows the use of the device 1 in a single-line lubrication system that is characterized by a single lubricant line 210 exiting from the device 1. FIG. 3 shows the use in a progressive-central lubrication system. In the progressive-central lubrication system a first lubricant line 210a leads from the device 1 to a first lubricant distributor 211a, at which a delivery of parts of the lubricant pumped thereto occurs. A second lubricant line 210b is connected to a plurality of the outlets of the lubricant distributor 211a, which second lubricant line 210b is connected to the inlet of a second lubricant distributor 211b. FIG. 4 shows the use in a multiple-line system or in a multiple-circuit lubrication system, which is characterized by a plurality of lubricant lines 210a, 210b and 210c exiting from the device 1.

Figure 5:
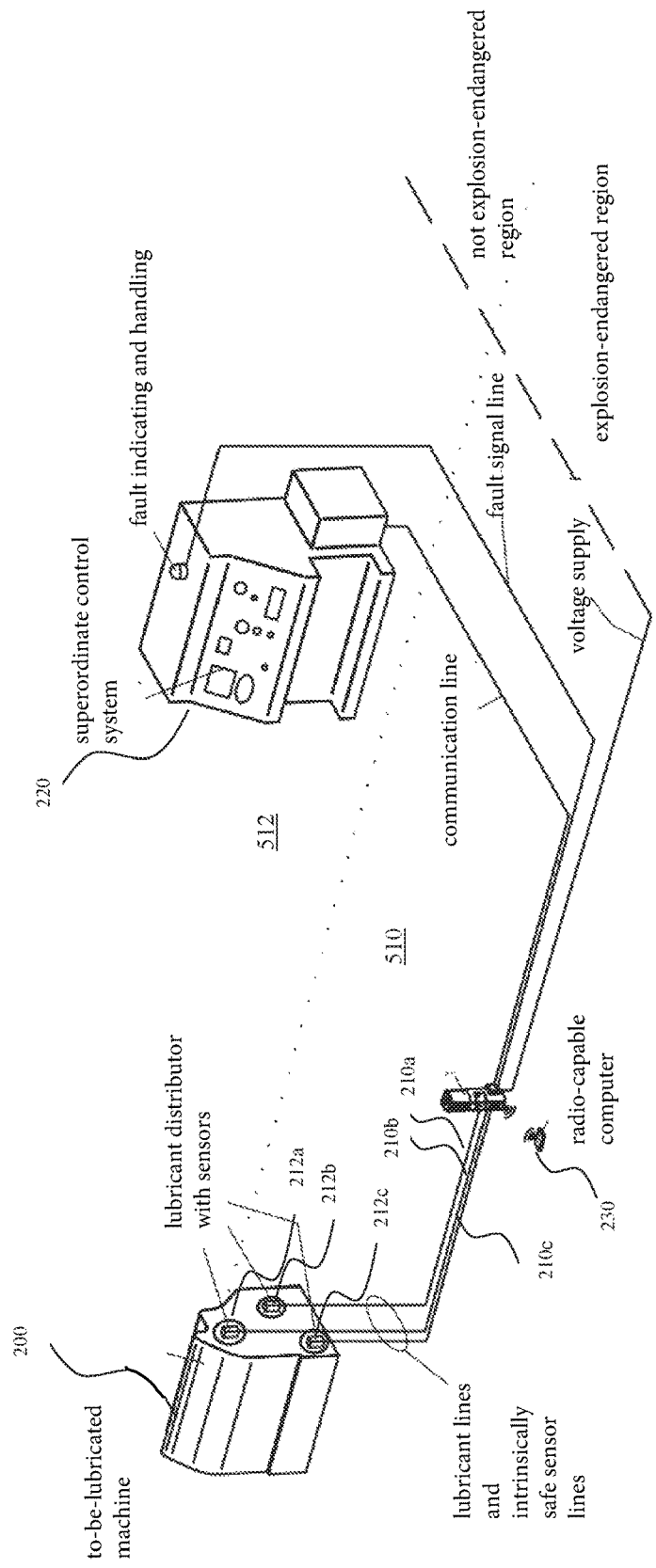
FIG. 5 schematically illustrates a lubrication system including the device according to FIG. 1.

FIG. 5 shows one possible use configuration. The device 1 is connected to a to-be-lubricated machine 200 that is located with the device in an explosion-endangered region 510. Here it serves 3 lubrication circuits 210a, 210b, each equipped with a sensor 212a, 212b, and 212c for monitoring the lubrication function. Connected to the device 1 there is a fault indicator and a superordinate control system 220 in the not-explosion-endangered region 512, which monitors and controls the lubrication function of the device 1. The control system 220 can receive and process the fault signal as well as control the emergency measures addressed above. The device 1 can alternatively or additionally also be monitored or controlled by a radio-capable computer 230.

To the extent that reference is made to individual standards in the description and in the patent claims, i.e., in the entire patent application, the version of the respective standard in force on the application date of the patent application is understood to be the standard in question. For the standard IEC 60079-0 this is the revision IEC 60079-0:2014 issued in June 2014. For the standard IEC 60079-1 this is the revision IEC 60079-1:2014 issued in June 2014. For the standard IEC 60079-11 this is the revision IEC 60079-11:2011 issued in June 2011. For the standard IEC 60079-18 this is the revision IEC 60079-18:2014 issued in December 2014. For the standard IEC 60079-25 this is the revision IEC 60079-25:2010 issued in February 2010. For the standard DIN EN 13463-2 this is the revision DIN EN 13463-2:2005-02 issued in February 2005. For the standard DIN EN 13463-3 this is the revision DIN EN 13463-3:2005-07 issued in July 2005. For the standard DIN EN 13463-8 this is the revision DIN EN 13463-8:2004-01 issued in January 2004.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved automatic lubrication devices.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Device
2 Lubricant container
3 Lubricant delivery device
4 Pumping device
5 Drive device
6 Internal control device
7 Force transmission device
8 First temperature sensor
9 Second temperature sensor
10 Operating panel 11 Corded signal interface
13 Radio module
14 External control device
15 Further signal interface
16 Lubricant outlet
17 Lubricant inlet
18 Pressure-limiting device
19 Pressure-release device
20 Fill-level sensor
21 First lubricant line
22 Second lubricant line
23 Stirring device
24 Electric motor
25 External pressure-switch/-sensor
26 Pressure indicator
27 Drive- and control-unit
28 Terminal for voltage supply
30 First encapsulation
31 First isolation- and amplification-device
32 Second isolation- and amplification-device
33 Third isolation- and amplification-device
34 Internal pressure-switch/-sensor
35 Power supply
36 Fault signal line
40 Second encapsulation
200 To-be-lubricated machine
210a, b, c Lubricant line
211a, b Lubricant distributor
212a, b, c Sensor
220 Control system
230 Computer
510 Explosion-endangered region
512 Not-explosion-endangered region

What is claimed is:

1. An automatic lubrication device comprising a plurality of components, the components including:
 a lubricant container configured to receive a lubricant;
 a lubricant delivery device for delivering the lubricant;
 a pump configured to pump the lubricant from the lubricant container to the lubricant delivery device;
 a drive configured to drive the pump, wherein the drive is coupled to the pump via a force-transmission device;
 an internal control device for controlling the drive; and a control panel configured to enter control commands for the internal control device as an interface for an operator; wherein
 a first set of the components comprising components that include potential electrical or non-electrical ignition sources, wherein the first set of components each include at least one suitable type of protection, which makes the potential ignition sources ineffective, so that a potential fire- or explosion-risk emanating from the automatic lubrication device is eliminated when the automatic lubrication device is used in a fire- and/or explosion-endangered environment.

2. The automatic lubrication device according to claim 1, wherein the drive and the internal control device include a first encapsulation that satisfies standards IEC 60079-1 and IEC 60079-0 of the International Electrotechnical Commission (IEC).

3. The automatic lubrication device according to claim 2, wherein for monitoring a lubrication function the internal control device is equipped with an interface for internal sensor signals that are sensed inside the first encapsulation and for external sensor signals that are sensed outside the first encapsulation.

4. The automatic lubrication device according to claim 2, further including a radio module that is configured for connecting the automatic lubrication device to an external control device, wherein the radio module includes a second encapsulation that satisfies one of the standards IEC 60079-1, IEC 60079-5, or IEC 60079-18 in addition to IEC 60079-0 of the IEC.

5. The automatic lubrication device according to claim 2, wherein the pump is not included in the first encapsulation.

6. The automatic lubrication device according to claim 1, wherein the control panel satisfies the standards IEC 60079-11 and IEC 60079-0 of the IEC.

7. The automatic lubrication device according to claim 1, wherein the drive comprises an electric motor and/or a fluid pump.

8. The automatic lubrication device according to claim 1, further comprising a first temperature sensor that is configured for recording at least one first temperature, and/or a first temperature protection switch that is configured for interrupting a power supply of the control panel in an event of a recording of a defined first maximum temperature.

9. The automatic lubrication device according to claim 8, further including a second sensor that is configured for recording at least one second temperature and/or a second temperature protection switch that is configured for interrupting the power supply of the drive in an event of a recording of a defined second maximum temperature.

10. The automatic lubrication device according to claim 1, further including a corded signal interface that is configured for connecting the automatic lubrication device to an external control device, wherein the signal interface is operated in a mode of intrinsic safety.

11. The automatic lubrication device according to claim 10, wherein the signal interface is operated according to standard IEC 60079-11, IEC 60079-25, and/or IEC 60079-27 in addition to standard IEC 60079-0 of the IEC.

12. The automatic lubrication device according to claim 1, further including a further signal interface that is configured for coupling the automatic lubrication device to one or more external sensors for monitoring a lubrication function, and wherein the further signal interface is operated in a mode of intrinsic safety, in particular according to the standard IEC 60079-11 and/or IEC 60079-25 in addition to IEC 60079-0 of the IEC.

13. The automatic lubrication device according to claim 1, wherein the lubricant delivery device comprises a lubricant line and wherein the components comprise the drive comprises a member of the first set of components.

14. The automatic lubrication device according to claim 1, wherein the pump is not enclosed by the at least one suitable type of protection.

15. The automatic lubrication device according to claim 1,
 wherein the drive and the internal control device include
  a first encapsulation that satisfies standards IEC 60079-1 and standard IEC 60079-0 of the IEC,
 wherein the control panel satisfies standards IEC 60079-11 and IEC 60079-0 of the IEC,
 wherein the drive comprises an electric motor and a fluid pump,
 wherein the internal control device is equipped with an interface for internal sensor signals that are sensed inside the first encapsulation and for external sensor signals that are sensed outside the first encapsulation,
 further comprising a first temperature sensor configured to record at least one first temperature, or a first temperature protection switch configured to interrupt a power supply of the control panel in an event of a recording of a defined first maximum temperature, further including a second sensor configured to record at least one second temperature or a second temperature protection switch configured to interrupt a power supply of the drive in an event of a recording of a defined second maximum temperature, further including a corded signal interface configured to connect the automatic lubrication device to an external control device, wherein the signal interface is operated according to standards IEC 60079-11, IEC 60079-25, and/or IEC 60079-27 in addition to standard IEC 60079-0 of the IEC, and further including a radio module configured to connect the automatic lubrication device to an external control device, wherein the radio module includes a second encapsulation that satisfies one of the standards IEC 60079-1, IEC 60079-5, or IEC 60079-18 in addition to IEC 60079-0 of the IEC.

16. The automatic lubrication device according to claim 1, wherein a second set of the components comprising components that do not include potential electrical or non-electrical ignition sources do not include at least one suitable type of protection for making the potential ignition sources ineffective.

17. An automatic lubrication device comprising a plurality of components, the components comprising:
- a lubricant container configured to receive a lubricant;
- a lubricant delivery line for delivering the lubricant;
- a pump configured to pump the lubricant from the lubricant container to the lubricant delivery line;
- a drive configured to drive the pump and being operably coupled to the pump, the drive including an electric motor; and
- a microprocessor for controlling the drive; and a control panel configured to enter control commands for the microprocessor; wherein the electric motor is encapsulated in a manner such that sparks produced by the electric motor cannot ignite combustible materials in an environment of the automatic lubrication device and the pump is not encapsulated in a manner such that sparks produced by the pump cannot ignite combustible materials in the environment of the automatic lubrication device.

18. The automatic lubrication device according to claim 17, wherein the microprocessor is encapsulated in a manner such that sparks produced by the microprocessor cannot ignite combustible materials in the environment of the automatic lubrication device.

* * * * *